United States Patent
Kim et al.

(10) Patent No.: US 9,660,780 B2
(45) Date of Patent: *May 23, 2017

(54) METHOD FOR FEEDING BACK CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Hyungtae Kim, Anyang-si (KR); Jonghyun Park, Anyang-si (KR); Kijun Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/203,281

(22) Filed: Jul. 6, 2016

(65) Prior Publication Data

US 2016/0315747 A1  Oct. 27, 2016

Related U.S. Application Data

(63) Continuation of application No. 14/383,220, filed as application No. PCT/KR2013/009418 on Oct. 22, 2013, now Pat. No. 9,438,395.

(Continued)

(51) Int. Cl.
*H04L 5/00* (2006.01)
*H04B 7/04* (2017.01)
(Continued)

(52) U.S. Cl.
CPC ............. *H04L 5/0048* (2013.01); *H04B 7/04* (2013.01); *H04B 7/0417* (2013.01);
(Continued)

(58) Field of Classification Search
CPC ... H04L 5/0048; H04L 5/0057; H04L 5/0094; H04L 5/0023; H04L 5/0082;
(Continued)

(56) References Cited

U.S. PATENT DOCUMENTS 8,634,363 B2* 1/2014 Kim ...................... H04L 5/0023
                                                                    370/329
2011/0170435 A1   7/2011 Kim et al.
(Continued)

FOREIGN PATENT DOCUMENTS

| WO | 2011/115421 A2 | 9/2011 |
| WO | 2011/153286 A1 | 12/2011 |
| WO | 2012/124552 A1 | 9/2012 |

OTHER PUBLICATIONS

CATT: "Discussion on periodic feedback for CoMP", 3GPP TSG RAN WG1 Meeting #70, R1-123516, Qingdao, China, Aug. 13-17, 2012.
(Continued)

*Primary Examiner* — Ajay Cattungal
(74) *Attorney, Agent, or Firm* — Dentons US LLP

(57) ABSTRACT

The present invention relates to a method for receiving a reference CSI configuration information and a following CSI configuration information which is configured to report a same RI (Rank Indicator) as the reference CSI configuration information, receiving a first CSI-RS (Channel State Information-Resource Signal) configuration information associated with the reference CSI configuration and a second CSI-RS configuration information associated with the following CSI configuration, number of CSI-RS antenna ports according to the second CSI-RS configuration information is same as number of CSI-RS antenna ports according to the first CSI-RS configuration information; and transmitting CSI determined based on at least one of the first CSI-RS
(Continued)

configuration information and the second CSI-RS configuration information.

8 Claims, 14 Drawing Sheets

Related U.S. Application Data

(60) Provisional application No. 61/717,628, filed on Oct. 23, 2012, provisional application No. 61/723,297, filed on Nov. 6, 2012.

(51) Int. Cl.
*H04B 7/0417* (2017.01)
*H04B 7/06* (2006.01)
*H04W 76/04* (2009.01)
*H04W 88/08* (2009.01)

(52) U.S. Cl.
CPC ......... *H04B 7/0626* (2013.01); *H04L 5/0023* (2013.01); *H04L 5/0035* (2013.01); *H04L 5/0057* (2013.01); *H04L 5/0073* (2013.01); *H04L 5/0082* (2013.01); *H04L 5/0091* (2013.01); *H04L 5/0094* (2013.01); *H04W 76/046* (2013.01); *H04W 88/08* (2013.01)

(58) Field of Classification Search
CPC ... H04L 5/0091; H04L 5/0035; H04L 5/0073; H04B 7/04; H04B 7/0417; H04B 7/0626; H04W 76/046; H04W 88/08
See application file for complete search history.

(56) References Cited

U.S. PATENT DOCUMENTS

| | | | | |
|---|---|---|---|---|
| 2011/0176634 A1* | 7/2011 | Yoon | ...................... | H04L 5/0023 375/295 |
| 2012/0189075 A1* | 7/2012 | Wang | ................... | H04B 7/0626 375/267 |
| 2014/0079146 A1* | 3/2014 | Kim | ...................... | H04B 7/0417 375/260 |

OTHER PUBLICATIONS

CATT: "Further discussion on periodic feedback", 3GPP TSG RAN WG1 Meeting #70, R1-123216, Qingdao, China, Aug. 13-17, 2012.
Hitachi Ltd.: "Discussion on reference CSI components for CoMP", 3GPP TSG-RAN WG1 #70bis, R1-124274, San Diego, CA, USA, Oct. 8-12, 2012.
CMCC: "Discussion on rank and subband constraints between CSI Processes", 3GPP TSG RAN WG1 Meeting #70bis, San Diego, CA, USA, R1-124427, Oct. 8-12, 2012.
MediaTek: "Further Discussions on Standardization Impacts on CoMP", 3GPP TSG-RAN WG1 #66, R1-112343, Athens, Greece, Aug. 22-26, 2011.
CATT: "Discussion on CQI for non-PMI/RI reporting in CoMP and TP for 36.213", 3GPP TSG RAN WG1 Meeting #70bis, R1-124098, San Diego, CA, USA, Oct. 8-12, 2012.
Intel Corporation: "Remaining details of periodic CSI reporting for DL CoMP", 3GPP TSG-RAN WG1 #70bis, R1-124116, San Diego, CA, USA, Oct. 8-13, 2012.

\* cited by examiner

E-UMTS

FIG. 2
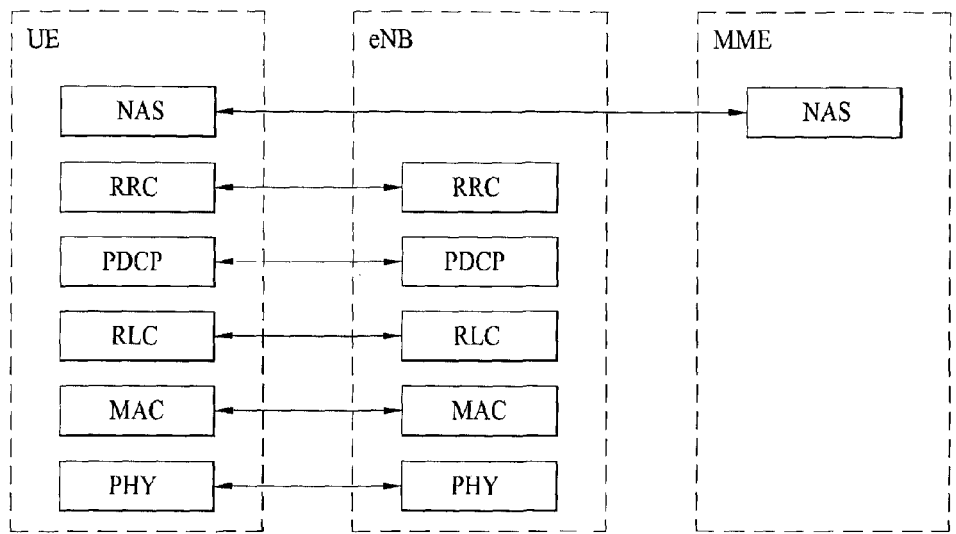
(A) CONTROL-PLANE PROTOCOL STACK
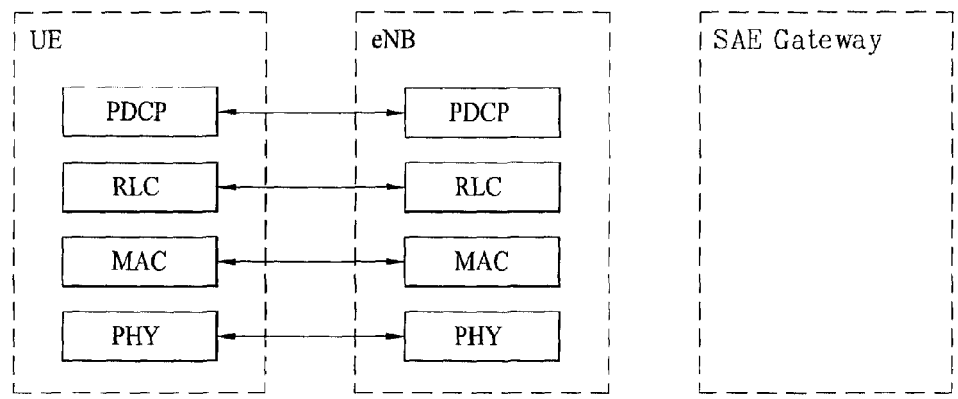
(B) USER-PLANE PROTOCOL STACK

| CQI REPORTING MODE | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE-SELECTED (SUBBAND CQI) | MODE 2-0 | MODE 2-1 |

FIG. 14
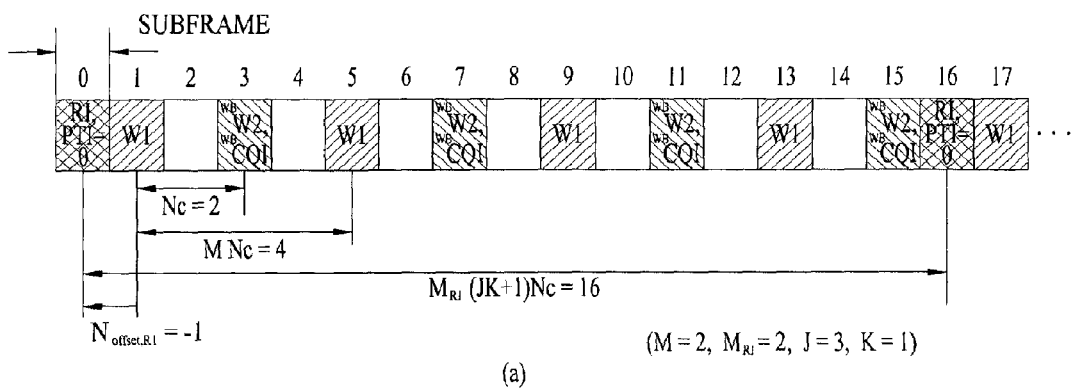
(a)
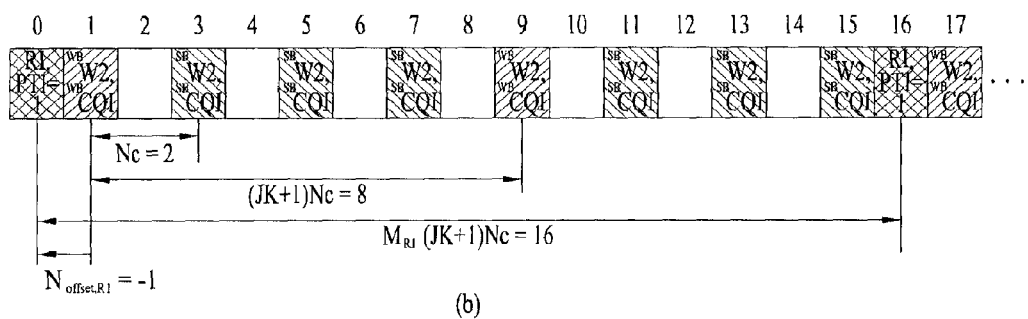
(b)
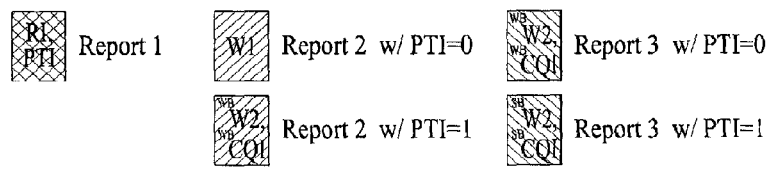

METHOD FOR FEEDING BACK CHANNEL STATE INFORMATION IN WIRELESS COMMUNICATION SYSTEM AND APPARATUS THEREFOR

This application is a continuation of U.S. patent application Ser. No. 14/383,220, filed Sep. 5, 2014, which application is a national stage entry of International Application No. PCT/KR2013/009418, filed Oct. 22, 2013, which claims priority to U.S. Provisional Application No. 61/717,628, filed Oct. 23, 2012, and 61/723,297, filed Nov. 6, 2012, all of which are incorporated herein by reference.

TECHNICAL FIELD

The present invention relates to wireless communication systems, and more particularly, to a method for feeding back channel state information in a wireless communication system and an apparatus therefor.

BACKGROUND ART

As an example of a wireless communication system to which the present invention is applicable, a 3rd Generation Partnership Project Long Term Evolution (3GPP LTE) (hereinafter, referred to as 'LTE') communication system is briefly described.

FIG. 1 is a view schematically illustrating the network architecture of an E-UMTS as an exemplary wireless communication system. An Evolved Universal Mobile Telecommunications System (E-UMTS) is an advanced version of a legacy Universal Mobile Telecommunications System (UMTS) and standardization thereof is currently underway in the 3GPP. E-UMTS may be generally referred to as an LTE system. For details of the technical specifications of UMTS and E-UMTS, reference can respectively be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of a network (Evolved-Universal Terrestrial Radio Access Network ((E-UTRAN)) and connected to an external network. The eNBs may simultaneously transmit multiple data streams for a broadcast service, a multicast service, and/or a unicast service.

One or more cells may exist in one eNB. A cell is configured to use one of bandwidths of 1.25, 2.5, 5, 10, 20 MHz to provide a downlink or uplink transport service to several UEs. Different cells may be configured to provide different bandwidths. The eNB controls data transmission and reception for a plurality of UEs. The eNB transmits downlink scheduling information for downlink data to notify a corresponding UE of a data transmission time/frequency domain, coding, data size, and Hybrid Automatic Repeat and reQuest (HARQ)-related information. In addition, the eNB transmits uplink scheduling information for uplink data to inform a corresponding UE of available time/frequency domains, coding, data size, and HARQ-related information. An interface for transmitting user traffic or control traffic may be used between eNBs. A Core Network (CN) may include an AG and a network node for user registration of the UE. The AG manages mobility of the UE on a Tracking Area (TA) basis, wherein one TA consists of a plurality of cells.

Although radio communication technology has been developed up to LTE based on Wideband Code Division Multiple Access (WCDMA), demands and expectations of users and service providers have continued to increase. In addition, since other radio access technologies continue to be developed, new technical evolution is required for future competitiveness. Decrease of cost per bit, increase of service availability, flexible use of a frequency band, simple structure and open interface, and suitable power consumption by a UE are required.

To aid in efficient management of a wireless communication system of an eNB, a UE periodically and/or aperiodically reports state information of a current channel to the eNB. Since the reported state information of the channel may include results calculated in consideration of various situations, a more efficient reporting method is needed.

DISCLOSURE

Technical Problem

An object of the present invention devised to solve the problem lies in providing a method for reporting channel state information in a wireless communication system and an apparatus therefor.

It will be appreciated by persons skilled in the art that that the technical objects that can be achieved through the present invention are not limited to what has been particularly described hereinabove and other technical objects of the present invention will be more clearly understood from the following detailed description.

Technical Solution

To achieve these and other advantages and in accordance with the purpose of the present invention, as embodied and broadly described, in a wireless access system supportive of multiple cells, a method of receiving a reference CSI configuration information and a following CSI configuration information which is configured to report a same RI (Rank Indicator) as the reference CSI configuration information, receiving a first CSI-RS (Channel State Information-Resource Signal) configuration information associated with the reference CSI configuration and a second CSI-RS configuration information associated with the following CSI configuration, wherein number of CSI-RS antenna ports according to the second CSI-RS configuration information is same as number of CSI-RS antenna ports according to the first CSI-RS configuration information; and transmitting CSI determined based on at least one of the first CSI-RS configuration information and the second CSI-RS configuration information.

According to one embodiment, the first CSI-RS configuration information and the second CSI-RS configuration information are related to CSI-RS of non-zero transmission power respectively.

According to one embodiment, the first CSI-RS configuration information and the second CSI-RS configuration information are transmitted through RRC (Radio Resource Control) signaling respectively.

According to one embodiment, the reference CSI configuration information and the following CSI configuration information are transmitted through RRC (Radio Resource Control) signaling respectively.

According to one embodiment, the CSI includes at least one of RI, PMI (Precoding Matrix Indicator), and CQI (Channel Quality Indicator).

To further achieve these and other advantages and in accordance with the purpose of the present invention, in a wireless access system supportive of multiple cells, a method of receiving a reference CSI configuration information and a following CSI configuration information which is configured to report a same RI (Rank Indicator) as the reference CSI configuration information, receiving a first CSI-RS (Channel State Information-Resource Signal) configuration information associated with the reference CSI configuration and a second CSI-RS configuration information associated with the following CSI configuration, wherein number of CSI-RS antenna ports according to the second CSI-RS configuration information is same as number of CSI-RS antenna ports according to the first CSI-RS configuration information, and transmitting CSI determined based on at least one of the first CSI-RS configuration information and the second CSI-RS configuration information.

According to one embodiment, the first CSI-RS configuration information and the second CSI-RS configuration information are related to CSI-RS of non-zero transmission power respectively.

According to one embodiment, the first CSI-RS configuration information and the second CSI-RS configuration information are transmitted through RRC (Radio Resource Control) signaling respectively.

According to one embodiment, the reference CSI configuration information and the following CSI configuration information are transmitted through RRC (Radio Resource Control) signaling respectively.

According to one embodiment, the CSI includes at least one of RI, PMI (Precoding Matrix Indicator), and CQI (Channel Quality Indicator).

To further achieve these and other advantages and in accordance with the purpose of the present invention, in a wireless access system supportive of multiple cells, a mobile station including a RF (Radio Frequency) module and a processor configured to: receive a reference CSI configuration information and a following CSI configuration information which is configured to report a same RI (Rank Indicator) as the reference CSI configuration information, receive a first CSI-RS (Channel State Information-Resource Signal) configuration information associated with the reference CSI configuration and a second CSI-RS configuration information associated with the following CSI configuration, wherein number of CSI-RS antenna ports according to the second CSI-RS configuration information is same as number of CSI-RS antenna ports according to the first CSI-RS configuration information, and transmit CSI determined based on at least one of the first CSI-RS configuration information and the second CSI-RS configuration information.

To further achieve these and other advantages and in accordance with the purpose of the present invention, in a wireless access system supportive of multiple cells, a base station including a RF (Radio Frequency) module and a processor configured to: receive a reference CSI configuration information and a following CSI configuration information which is configured to report a same RI (Rank Indicator) as the reference CSI configuration information, receive a first CSI-RS (Channel State Information-Resource Signal) configuration information associated with the reference CSI configuration and a second CSI-RS configuration information associated with the following CSI configuration, wherein number of CSI-RS antenna ports according to the second CSI-RS configuration information is same as number of CSI-RS antenna ports according to the first CSI-RS configuration information, and transmit CSI determined based on at least one of the first CSI-RS configuration information and the second CSI-RS configuration information.

Advantageous Effects

According to embodiments of the present invention, channel state information can be effectively reported in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 2 illustrates structures of a control plane and a user plane of a radio interface protocol between a UE and an E-UTRAN based on the 3GPP radio access network specification;

FIG. 14 illustrates a periodic reporting process of CSI when a hierarchical codebook is used;

BEST MODE

Figure 1:
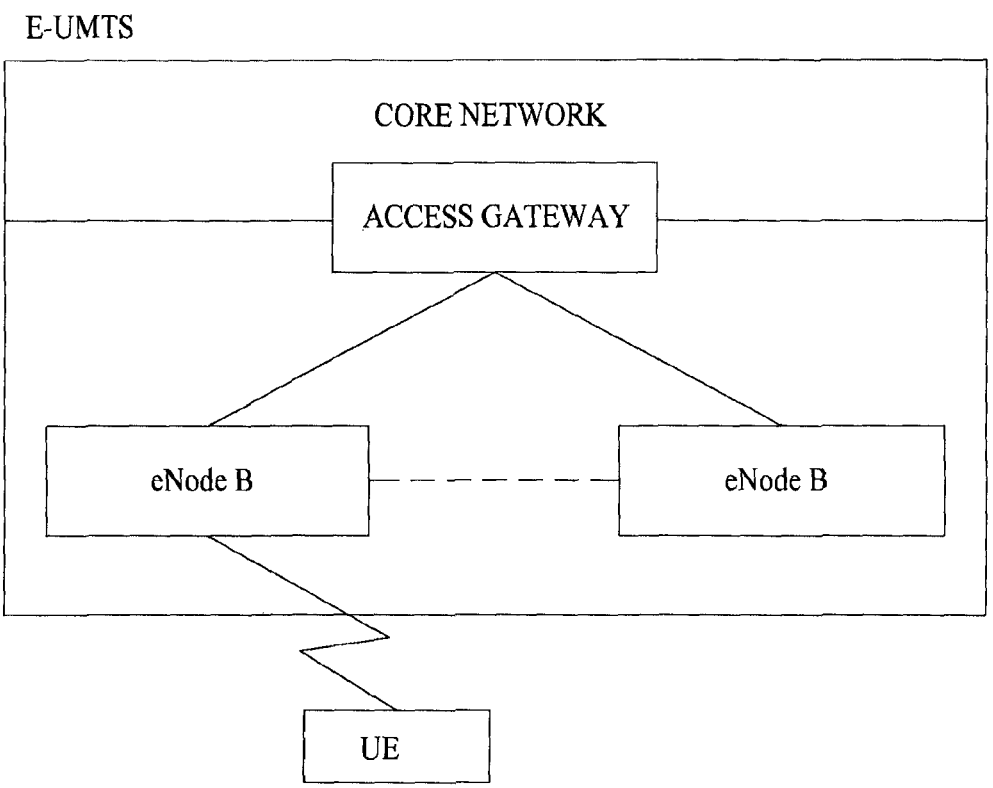
FIG. 1 schematically illustrates the network architecture of an E-UMTS as an exemplary wireless communication system.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
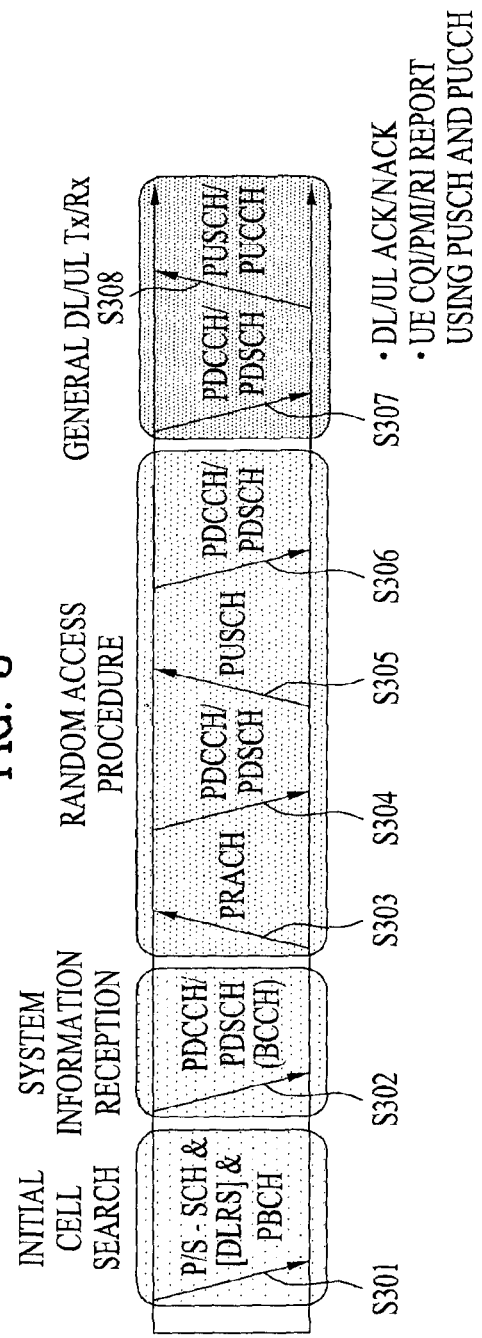
FIG. 3 illustrates physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
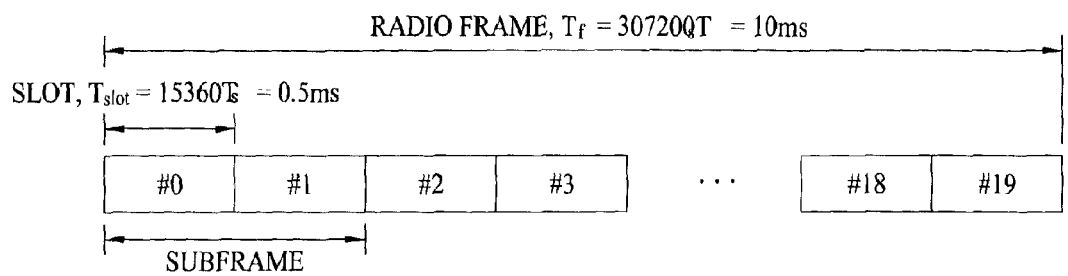
FIG. 4 illustrates the structure of a radio frame used in an LTE system.

FIG. 4 is a view illustrating the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15\ \text{kHz} \times 2048) = 3.2552 \times 10^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
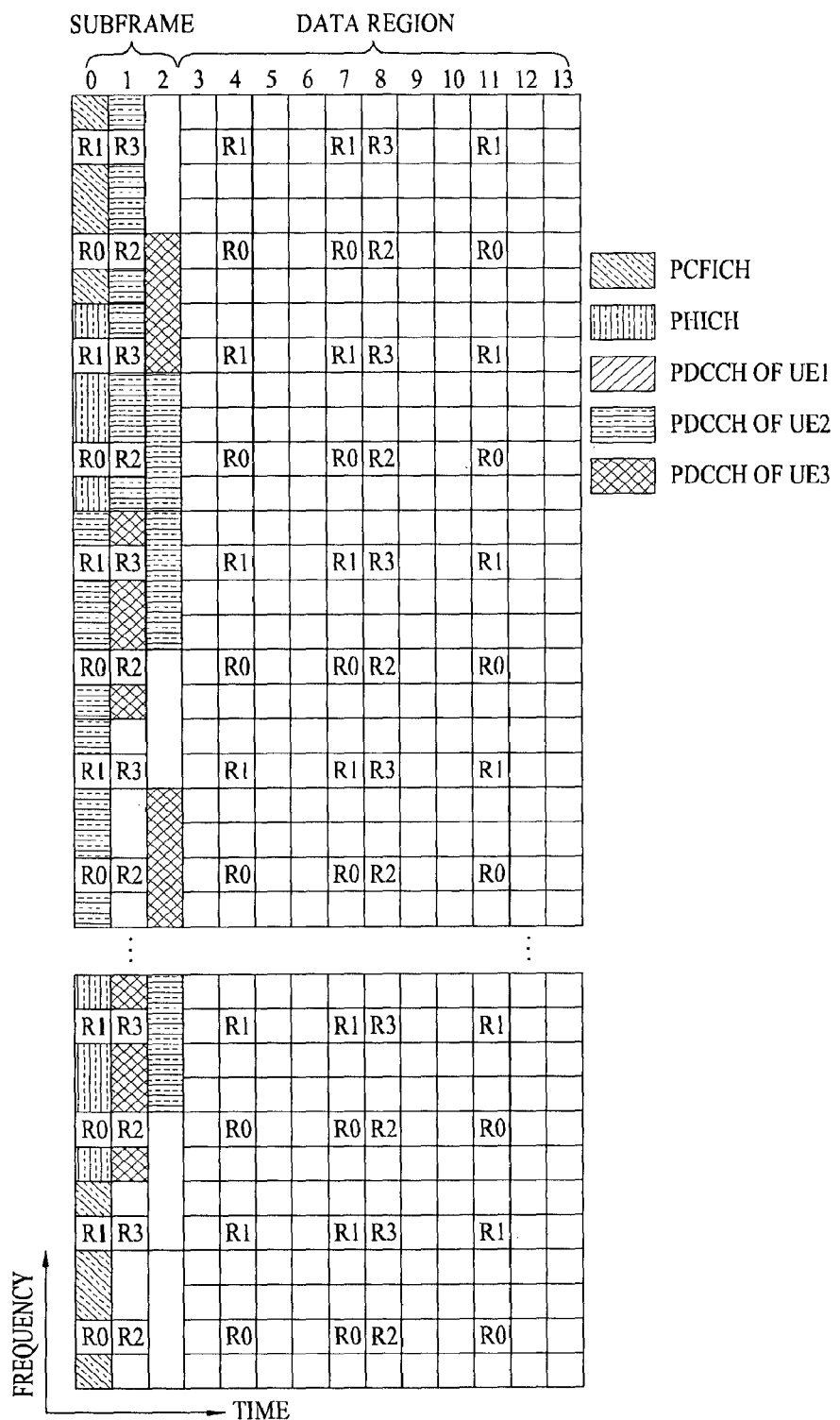
FIG. 5 illustrates the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
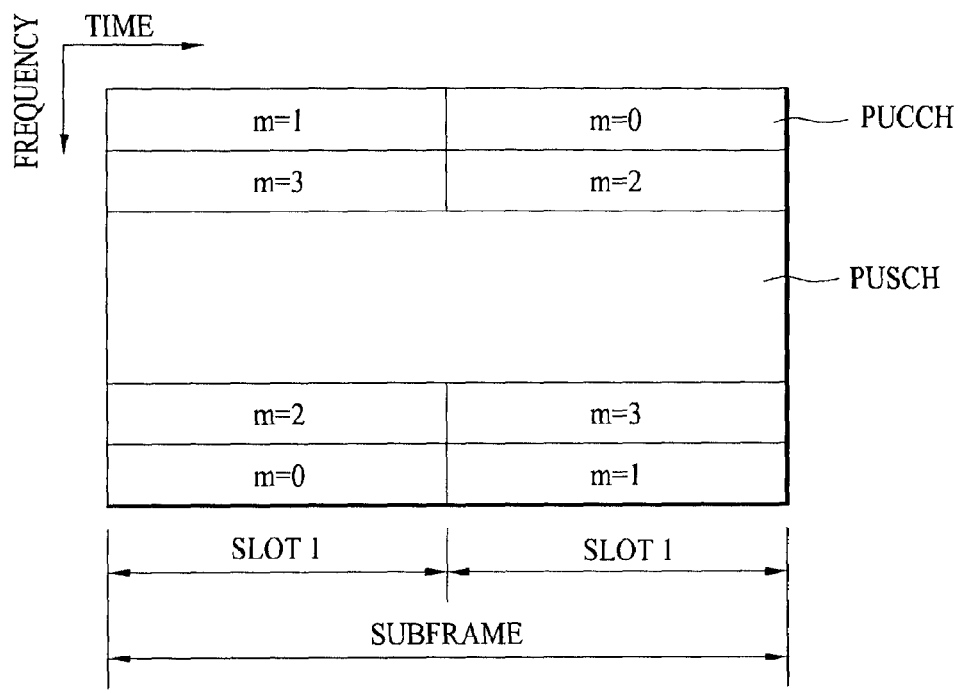
FIG. 6 illustrates the structure of an uplink subframe used in the LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

MIMO System

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
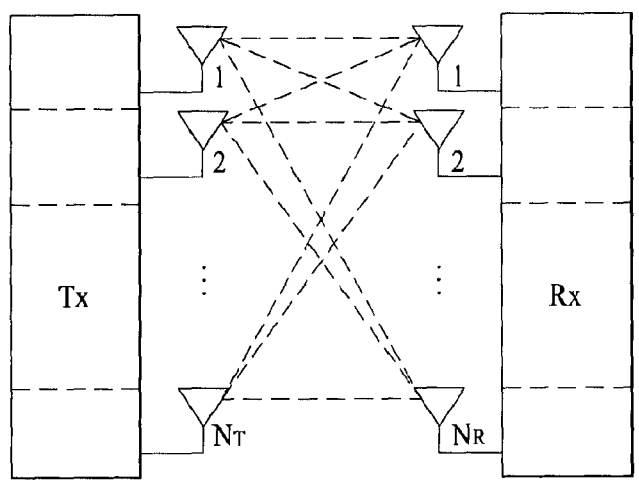
FIG. 7 illustrates the configuration of a general MIMO communication system.

The configuration of a general MIMO communication system is shown in FIG. 7. A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, $3^{rd}$ generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ G_{N_T} \end{bmatrix} = Ps \qquad \text{[Equation 4]}$$

*78

$N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \qquad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \qquad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

CSI Feedback

Now, a description of a Channel State Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1\,W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \quad \text{[Equation 9]}$$

where $X_i$ is $Nt/2$ by $M$ matrix.

$$W2(j) = \begin{bmatrix} e_M^k & e_M^l & e_M^m \\ \alpha_j e_M^k & \beta_j e_M^l & \cdots & \gamma_j e_M^m \end{bmatrix} (\text{if rank} = r),$$

where $1 \le k, l, m \le M$ and $k, l, m$ are integer.

where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where $N_T$ is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

As described above, CSI in the LTE system includes, but is not limited to, CQI, PMI, and RI. According to transmission mode of each UE, all or some of the CQI, PMI, and RI is transmitted. Periodic transmission of CSI is referred to as periodic reporting and transmission of CSI at the request of an eNB is referred to as aperiodic reporting. In aperiodic reporting, a request bit included in uplink scheduling information transmitted by the eNB is transmitted to the UE. Then, the UE transmits CSI considering transmission mode thereof to the eNB through an uplink data channel (PUSCH). In periodic reporting, a period of CSI and an offset at the period are signaled in the unit of subframes by a semi-static scheme through a higher-layer signal per UE. The UE transmits CSI considering transmission mode to the eNB through an uplink control channel (PUCCH). If there is uplink data in a subframe in which CSI is transmitted, the CSI is transmitted through an uplink data channel (PUSCH) together with the uplink data. The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

FIGS. 8 to 11 illustrate periodic reporting of CSI in an LTE system.

Figures 8, 9:
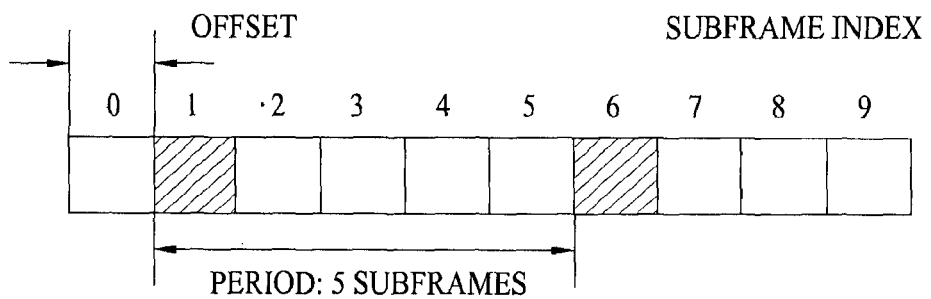
FIGS. 8 to 11 illustrate periodic reporting of CSI.

Referring to FIG. 8, there are four CQI reporting modes in the LTE system. Specifically, the CQI reporting modes may be divided into modes in a WideBand (WB) CQI and modes in a SubBand (SB) CQI according to CQI feedback type. The CQI reporting mode may also be divided into modes in a No PMI and modes in a single PMI depending on whether a PMI is transmitted or not. Each UE is informed of information comprised of a period and an offset through RRC signaling in order to periodically report CQI.

FIG. 9 illustrates an example of transmitting CSI when a UE receives information indicating {a period '5' and an offset '1'} through signaling. Referring to FIG. 9, upon receiving the information indicating the period '5' and offset '1', the UE transmits CSI in the unit of 5 subframes with an offset of one subframe in ascending order of a subframe index counted from 0 starting from the first subframe. Although the CSI is transmitted basically through a PUCCH, if a PUSCH for data transmission is present at the same transmission time point, the CSI is transmitted through the PUSCH together with data. The subframe index is given as a combination of a system frame number (or a radio frame index) $n_f$ and a slot index $n_s$ (0 to 19). Since one subframe includes two slots, the subframe index may be defined as $10 \times n_f + \text{floor}(n_s/2)$ wherein floor( ) indicates the floor function.

CQI transmission types include a type of transmitting a WB CQI only and a type of transmitting both a WB CQI and an SB CQI. In the type of transmitting a WB CQI only, CQI information for all bands is transmitted in subframes corresponding to every CQI transmission period. Meanwhile, in the case in which PMI information should also be transmitted according to the PMI feedback type as illustrated in FIG. 8, the PMI information is transmitted together with the CQI information. In the type of transmitting both a WB CQI and an SB CQI, the WB CQI and SB CQI are alternately transmitted.

Figure 10:
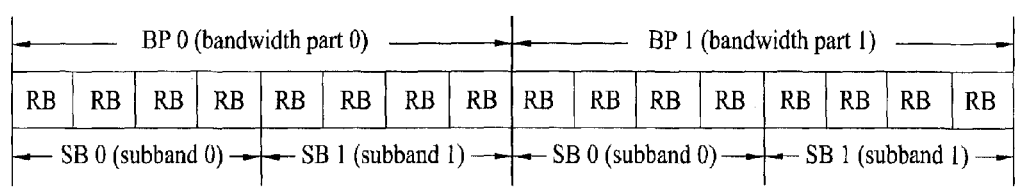
Figure 11:
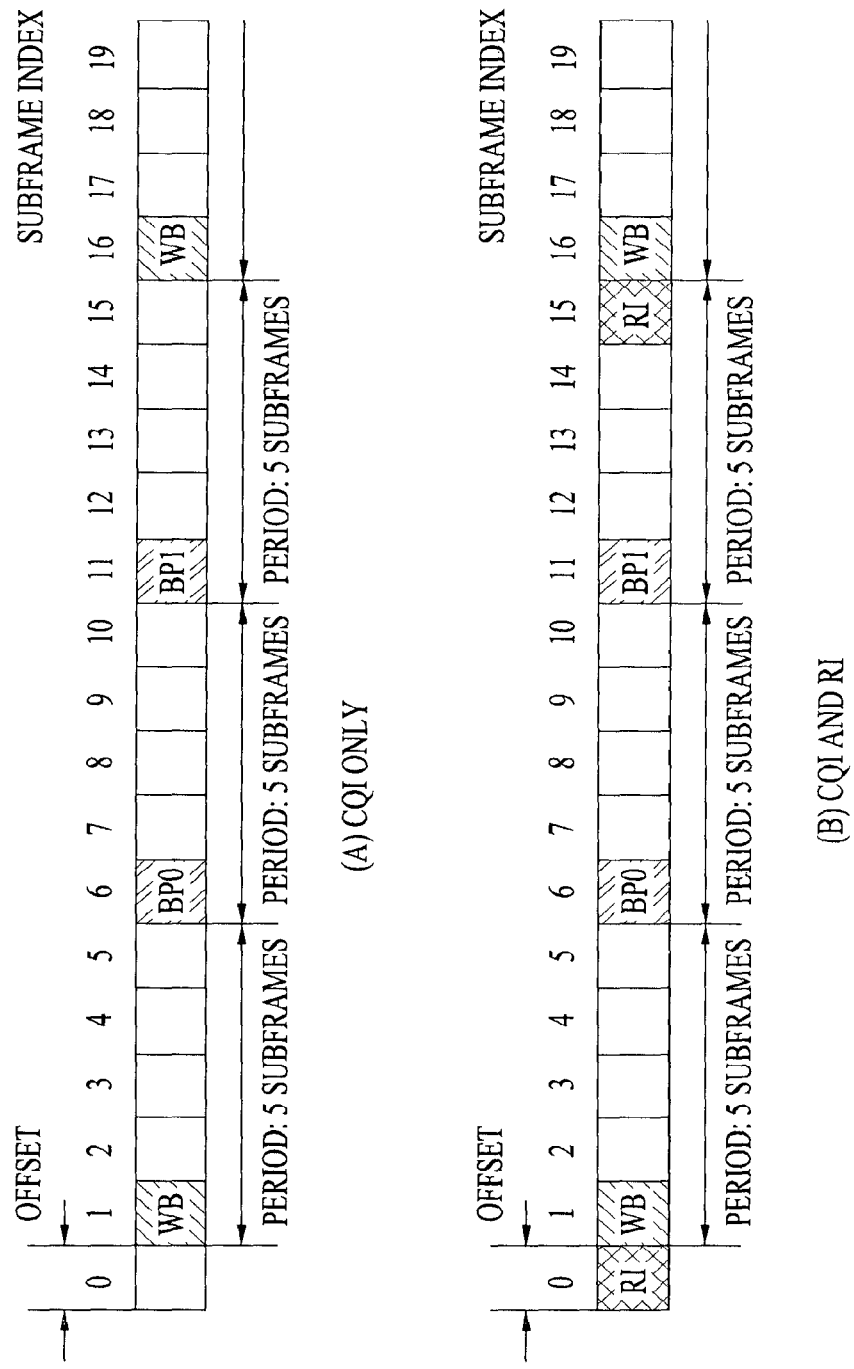

FIG. 10 illustrates a system in which a system bandwidth consists of 16 RBs. It is assumed that the system bandwidth includes two Bandwidth Parts (BPs) BP0 and BP1 each consisting of two SubBands (SBs) SB0 and SB1 and each SB includes 4 RBs. The above assumption is exemplary and the number of BPs and the size of each SB may vary with the size of the system bandwidth. The number of SBs constituting each BP may differ according to the number of RBs, the number of BPs, and the size of each SB.

In the CQI transmission type of transmitting both a WB CQI and an SB CQI, the WB CQI is transmitted in the first CQI transmission subframe and an SB CQI of the better SB state of SB0 and SB1 in BP0 is transmitted in the next CQI transmission subframe together with and an index of the corresponding SB (e.g. Subband Selection Indicator (SSI). Thereafter, an SB CQI of the better SB state of SB0 and SB1 in BP1 and an index of the corresponding SB are transmitted in the next CQI transmission subframe. Thus, CQI of each BP is sequentially transmitted after transmission of the WB CQI. The CQI of each BP may be sequentially transmitted once to four times during the interval between transmission intervals of two WB CQIs. For example, if the CQI of each BP is transmitted once during the time interval between two WB CQIs, CQIs may be transmitted in the order of WB CQI ⇒ BP0 CQI ⇒ BP1 CQI ⇒ WB CQI. If the CQI of each BP is transmitted four times during the time interval between two WB CQIs, CQIs may be transmitted in the order of WB CQI ⇒ BP0 CQI ⇒ BP1 CQI ⇒ BP0 CQI ⇒ BP1 CQI ⇒ BP0 CQI ⇒ BP1 CQI ⇒ BP0 CQI ⇒ BP1 CQI ⇒ WB CQI. Information as to how many times each BP CQI is transmitted is signaled by a higher layer (RRC layer).

FIG. 11(a) illustrates an example of transmitting both a WB CQI and an SB CQI when a UE receives information indicating {period '5' and offset '1'} through signaling. Referring to FIG. 11(a), a CQI may be transmitted only in subframes corresponding to the signaled period and offset regardless of type. FIG. 11(b) illustrates an example of transmitting an RI in addition to the example shown in FIG. 11(a). The RI may be signaled as a combination of a multiple of a WB CQI transmission period and an offset at the transmission period from a higher layer (e.g. RRC layer). The offset of the RI is signaled using a value relative to the offset of a CQI. For example, if the offset of the CQI is '1' and the offset of the RI is '0', the RI has the same offset as the CQI. The offset value of the RI is defined as 0 or a negative number. More specifically, it is assumed in FIG. 11(b) that, in an environment identical to that of FIG. 11(a), an RI transmission period is a multiple of 1 of the WB CQI transmission period and the RI offset is '−1'. Since the RS transmission period is a multiple of 1 of the WB CQI transmission period, the RS transmission period and the WB CQI transmission period are substantially the same. Since the offset of the RI is '−1', the RI is transmitted based upon the value '−1' (i.e. subframe index 0) relative to the offset '1' of the CQI in FIG. 11(a). If the offset of the RI is '0', the transmission subframes of the WB CQI and RI overlap. In this case, the WB CQI is dropped and the RI is transmitted.

Figure 12:
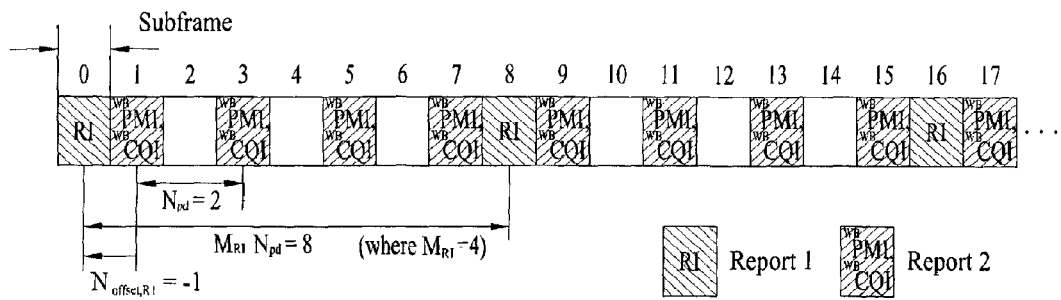
FIGS. 12 and 13 illustrate periodic reporting processes of CSI when a non-hierarchical codebook is used.

FIG. 12 illustrates CSI feedback in the case of Mode 1-1 of FIG. 8.

Referring to FIG. 12, CSI feedback is comprised of two types of report content, i.e. transmission of Report 1 and transmission of Report 2. More specifically, an RI is transmitted through Report 1 and a WB PMI and a WB CQI are transmitted through Report 2. Report 2 is transmitted in subframe indexes satisfying $(10 \ast n_f + \text{floor}(n_s/2) - N_{offset,CQI}) \mod(N_{pd}) = 0$. $N_{offset,CQI}$ indicates an offset for PMI/CQI transmission shown in FIG. 9. In FIG. 12, $N_{offset,CQI} = 1$. $N_{pd}$ illustrates an interval of subframes between contiguous Reports 2 and the case of $N_{pd} = 2$ is illustrated in FIG. 12. Report 1 is transmitted in subframe indexes satisfying $(10 \ast n_f + \text{floor}(n_s/2) - N_{offset,CQI} - N_{offset,RI}) \mod(M_{RI} \ast N_{pd}) = 0$. $M_{RI}$ is determined by higher layer signaling. $N_{offset,RI}$ denotes a relative offset value for RI transmission shown in FIG. 11. The case in which $M_{RI} = 4$ and $N_{offset,RI} = -1$ is illustrated in FIG. 12.

Figure 13:
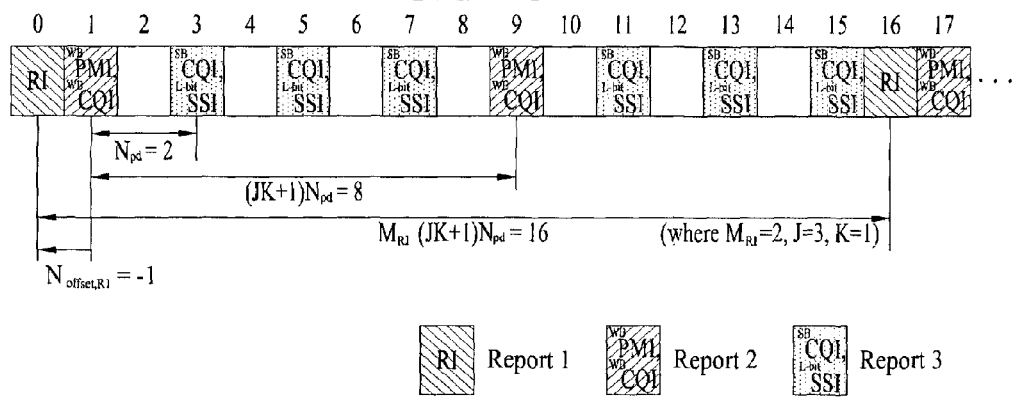

FIG. 13 illustrates CSI feedback in the case of Mode 2-1 of FIG. 8.

Referring to FIG. 13, CSI feedback is comprised of three types of report content, i.e. transmission of Report 1, transmission of Report 2, and transmission of Report 3. More specifically, an RI is transmitted through Report 1, a WB PMI and a WB CQI are transmitted through Report 2, and an SB CQI and an L-bit Subband Selection Indicator (SSI) are transmitted through Report 3. Report 2 or Report 3 is transmitted in subframe indexes satisfying $(10 \ast n_f + \text{floor}(n_s/2) - N_{offset,CQI}) \mod(N_{pd}) = 0$. Especially, Report 2 is transmitted in subframe indexes satisfying $(10 \ast n_f + \text{floor}(n_s/2) - N_{offset,CQI}) \mod(H \ast N_{pd}) = 0$. Accordingly, Report 2 is transmitted at an interval of $H \ast N_{pd}$ and subframes between contiguous Reports are filled with transmission of Report 3. At this time, H equals to $J \ast K + 1$ wherein J is the number of BPs. K is a value indicating how many full cycles will be consecutively performed, wherein the full cycle is a cycle during which a process for selectively transmitting a subband once per different BP over all BPs. K is determined by higher layer signaling. The case in which $N_{pd} = 2$, $J = 3$, and $K = 1$ is illustrated in FIG. 13. Report 1 is transmitted in subframe indexes satisfying $(10 \ast n_f + \text{floor}(n_s/2) - N_{offset,CQI} - N_{offset,RI}) \mod(M_{RI} \ast (J \ast K + 1) \ast N_{pd}) = 0$. The case in which $M_{RI} = 2$ and $N_{offset,RI} = -1$ is illustrated in FIG. 13.

FIG. 14 illustrates periodic reporting of CSI which is being discussed in LTE-A. If an eNB includes 8 Tx antennas in Mode 2-1, then a 1-bit indicator, i.e. a Precoder Type Indication (PTI) parameter, is configured and periodic reporting modes classified into two types according to the PTI value are considered. In FIG. 14, W1 and W2 illustrate hierarchical codebooks described with reference to Equations 8 and 9. If both W1 and W2 are determined, a completed type of a precoding matrix W is determined by combining W1 and W2.

Referring to FIG. 14, in the case of periodic reporting, different contents corresponding to Report 1, Report 2, and Report 3 are reported according to different repetition periods. An RI and a 1-bit PTI value are reported through Report 1. A WB W1 (when PTI=0) or a WB W2 and a WB CQI (when PTI=1) are reported through Report 2. A WB W2 and a WB CQI (when PTI=0) or an SB W2 and an SB CQI (when PTI=1) are reported through Report 3.

Report 2 and Report 3 are transmitted in subframes (for convenience, referred to as a first subframe set) having subframe indexes satisfying $(10*n_f+\text{floor}(n_s/2)-N_{offset,CQI}) \mod(N_C)=0$ wherein $N_{offset,CQI}$ is an offset value for PMI/CQI transmission shown in FIG. 9 and $N_c$ denotes a subframe interval between contiguous Reports 2 or Reports 3. The case in which $N_{offset,CQI}=1$ and $N_c=2$ is illustrated in FIG. 14. The first subframe set is comprised of subframes having odd-numbered indexes. $n_f$ denotes a system frame number (or radio frame index) and $n_s$ denotes a slot index in a radio frame. floor( ) indicates the floor function and 'A mod B' indicates a remainder obtained by dividing A by B.

Report 2 is located in some subframes in the first subframe set and Report 3 is located in the other subframes. More specifically, Report 2 is located in subframes having subframe indexes satisfying $(10*n_f+\text{floor}(n_s/2)-N_{offset,CQI}) \mod(H*N_c)=0$. Accordingly, Report 2 is transmitted at an interval of $H*N_c$ and one or more first subframes between contiguous Reports 2 are filled with transmission of Report 3. If PTI=0, then H=M and M is determined by higher layer signaling. The case in which M=2 is illustrated in FIG. 14. If PTI=1, then H=J*K+1, K is determined by higher layer signaling, and J is the number of BPs. In FIG. 14, J=3 and K=1.

Report 1 is transmitted in subframes having subframe indexes satisfying $(10*n_f+\text{floor}(n_s/2)-N_{offset,CQI}-N_{offset,RI}) \mod(M_{RI}*(J*K+1)*N_c)=0$ wherein $M_{RI}$ is determined by higher layer signaling. $N_{offset,RI}$ indicates a relative offset value for an RI. In FIG. 14, $M_{RI}=2$ and $N_{offset,RI}=-1$. The transmission time points of Report 1 and Report 2 do not overlap because $N_{offset,RI}=-1$. When a UE calculates RI, W1, and W2, they are associated with each other. For example, W1 and W2 are calculated depending on RI and W2 is calculated depending on W1. A BS may be aware of a final W from W1 and W2 when both Report 2 and Report 3 are reported after Report 1 is reported.

CSI Feedback of CoMP

Hereinafter, Cooperative Multipoint (CoMP) transmission/reception will be described.

In a system after LTE-A, a scheme for raising system performance by enabling cooperation between a plurality of cells is attempted. Such a scheme is called CoMP transmission/reception. CoMP refers to a scheme in which two or more eNBs, access points, or cells cooperatively communicate with a UE for smooth communication between a specific UE and an eNB, an access point, or a cell. In the present invention, eNB, access point, and cell may be used interchangeably.

In general, in a multi-cell environment in which a frequency reuse factor is 1, the performance of the UE located at a cell edge and average sector throughput may be reduced due to Inter-Cell Interference (ICI). In order to reduce ICI, a legacy LTE system uses a method of enabling the UE located at a cell edge to have appropriate throughput performance using a simple passive scheme such as Fractional Frequency Reuse (FFR) through UE-specific power control in an environment restricted by interference. However, it is desirable that ICI be reduced or the UE reuse ICI as a desired signal, rather than decreasing the use of frequency resources per cell. In order to accomplish the above purpose, a CoMP transmission scheme may be employed.

Figure 15:
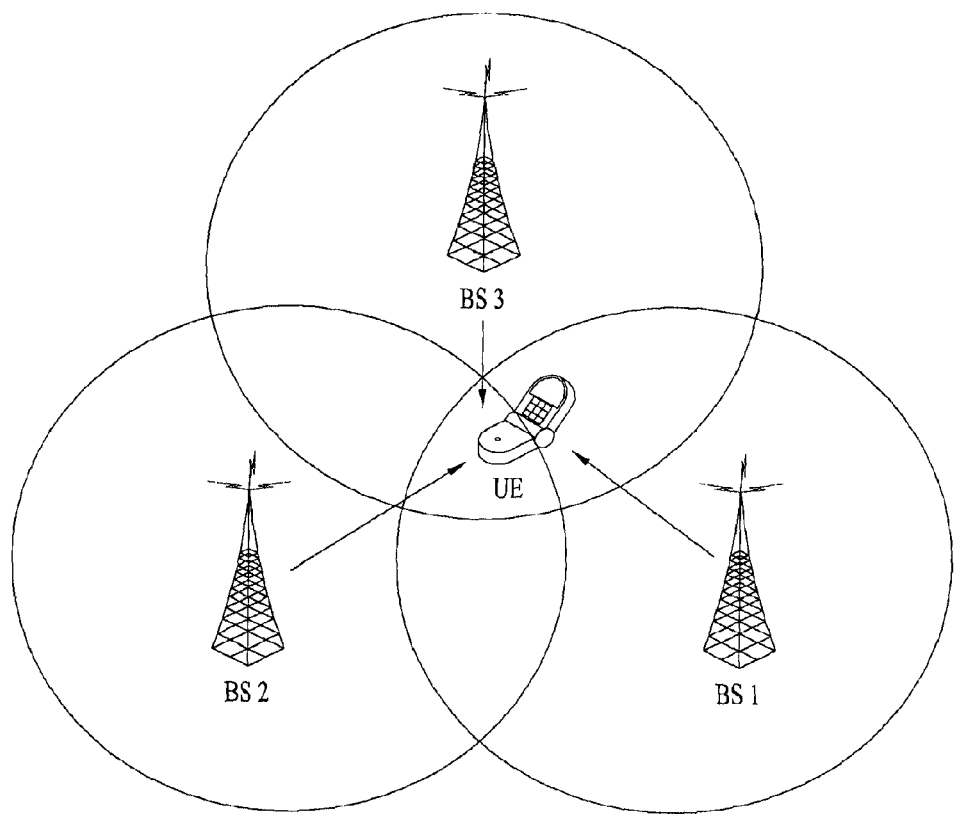
FIG. 15 illustrates an example of performing CoMP.

FIG. 15 illustrates an example of performing CoMP. Referring to FIG. 15, a radio communication system includes a plurality of eNBs eNB1, eNB2, and eNB3 that perform CoMP and a UE. The plural eNBs eNB1, eNB2, and eNB3 for performing CoMP may efficiently transmit data to the UE through cooperation.

A CoMP transmission scheme may be divided into CoMP-Joint Processing (CoMP-JP) which is a cooperative MIMO type of JP through data sharing and CoMP-Coordinated Scheduling/Coordinated Beamforming (CoMP-CS/CB).

In the case a CoMP-JP scheme in downlink, a UE may simultaneously receive data from a plurality of eNB implementing the CoMP transmission scheme and may improve reception performance by combining signals received from the respective eNBs (Joint Transmission (JT)). In addition, a method in which one of a plurality of eNBs performing the CoMP transmission scheme transmits data to the UE at a specific time point may be considered (Dynamic Point Selection (DPS). In a CoMP-CS/CB scheme in downlink, the UE may instantaneously receive data through one eNB, i.e. a serving eNB by beamforming.

If the CoMP-JP scheme is applied in uplink, a plurality of eNBs may simultaneously receive a PUSCH signal from the UE (Joint Reception (JR)). In the case of CoMP-CS/CB in uplink, only one eNB may receive a PUSCH signal. Cooperative cells (or eNBs) may determine to use the CoMP-CS/CB scheme.

A UE using the CoMP transmission scheme, i.e. a CoMP UE, may feed back channel information feedback (hereinafter, CSI feedback) to a plurality of eNBs performing the CoMP transmission scheme. A network scheduler may select a proper CoMP transmission scheme capable of raising a transmission rate among the CoMP-JP, CoMP-CS/CB, and DPS schemes based on CSI feedback. To this end, a periodic feedback transmission scheme using a PUCCH may be used as a method in which the UE configures CSI feedback in a plurality of eNBs performing the CoMP transmission scheme. In this case, feedback configurations for the eNBs may be independent of one another. Accordingly, in the disclosure according to an embodiment of the present invention, an operation of feeding back CSI with such an independent feedback configuration is referred to as a CSI process. One or more CSI processes may be performed in one serving cell.

Figure 16:
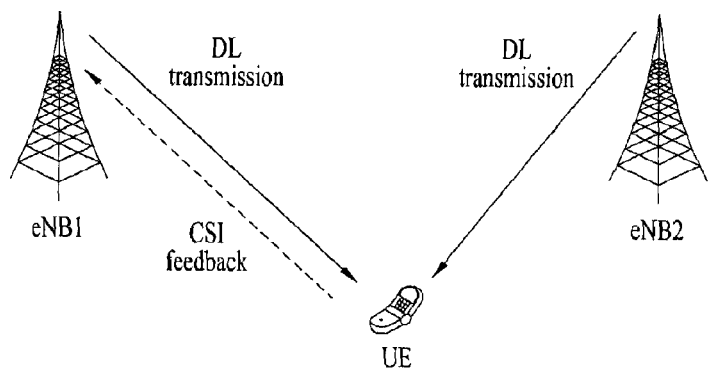
FIG. 16 illustrates a downlink CoMP operation.

FIG. 16 illustrates a downlink CoMP operation.

In FIG. 16, a UE is positioned between an eNB1 and an eNB2 and the two eNBs, i.e. eNB1 and eNB2, perform a proper CoMP operation such as JT, DCS, or CS/CB to solve a problem of interference to the UE. To aid in the CoMP operation of the eNBs, the UE performs proper CSI feedback. Information transmitted through CSI feedback includes PMI and CQI of each eNB and may additionally include channel information between the two eNBs (e.g. phase offset information between two eNB channels) for JT.

In FIG. 16, although the UE transmits a CSI feedback signal to the eNB1 which is a serving cell thereof, the UE may transmit the CSI feedback signal to the eNB2 or the two eNBs, according to situation. In addition, in FIG. 16, while the eNBs are described as a basic unit participating in CoMP, the present invention may be applied to CoMP between Transmission Points (TPs) controlled by a single eNB.

That is, for CoMP scheduling in a network, the UE should feed back not only downlink CSI of a serving eNB/TP but also downlink CSI of a neighboring eNB/TP. To this end, the UE feeds back a plurality of CSI processes reflecting various interference environments of eNBs/TPs for data transmission.

Accordingly, an Interference Measurement Resource (IMR) is used to measure interference during CoMP CSI calculation in an LTE system. A plurality of IMRs may be configured for one UE and each of the plural IMRs may be independently configured. That is, the period, offset, and resource configuration of the IMR are independently determined and may be signaled by an eNB to a UE using higher layer signaling (RRC etc.).

In addition, a CSI-RS is used to measure a channel desired for CoMP CSI calculation in the LTE system. A plurality of CSI-RSs may be configured for one UE and each of the CSI-RSs in independently configured. Namely, each CSI-RS includes an independently configured period, offset, resource configuration, power control, and the number of antenna ports and information related to the CSI-RS is signaled to the UE from the eNB through higher layer signaling (RRC etc.).

Among a plurality of CSI-RSs and a plurality of IMRs configured for a UE, one CSI process may be defined in association with one CSI-RS resource for signal measurement and one IMR for interference measurement. The UE feeds back CSI having different periods and subframe offsets, derived from different CSI processes, to a network (e.g. eNB).

That is, each CSI process has an independent CSI feedback configuration. The eNB may signal the CSI-RS resource, IMR association information, and CSI feedback configuration to the UE through higher layer signaling of RRC etc. on a CSI process basis. For example, it is assumed that three CSI processes as shown in Table 1 are configured for the UE.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 indicate a CSI-RS received from an eNB 1 which is a serving eNB of the UE and a CSI-RS received from an eNB 2 which is a neighboring eNB participating in cooperation. It is assumed that IMRs configured for the CSI processes of Table 1 are configured as shown in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

In IMR 0, the eNB 1 performs muting, the eNB 2 performs data transmission, and the UE is configured to measure interference of eNBs except for the eNB 1 from IMR 0. Similarly, in IMR 1, the eNB 2 performs muting, the eNB 1 performs data transmission, and the UE is configured to measure interference of eNBs except for the eNB 2 from IMR 1. In addition, in IMR 2, both the eNB 1 and eNB2 perform muting and the UE is configured to measure interference of eNBs except for the eNB 1 and eNB 2 from IMR 2.

Accordingly, as shown in Table 1 and Table 2, CSI of CSI process 0 indicates optimal RI, PMI, and CQI when data is received from the eNB 1. CSI of CSI process 1 indicates optimal RI, PMI, and CQI when data is received from the eNB 2. CSI of CSI process 2 indicates optimal RI, PMI, and CQI, when data is received from the eNB 1 and there is no interference from the eNB 2.

Collision of CSI of CoMP

For CoMP scheduling, a UE should feed not only channel information of a serving cell or a serving transmission point (TP) but also channel information of a neighboring cell or TP participating in CoMP back to a BS. Accordingly, for CoMP, a UE feeds back CSI according to a plurality of CSI processes considering an interference environment with a plurality of cells or TPs.

One CSI process is defined as association between one CSI-RS resource for signal measurement and one interference measurement resource (IMR) for interference measurement. In addition, each CSI process has an independent CSI feedback configuration. The CSI feedback configuration includes a feedback mode, a feedback period and an offset.

It is desirable that CSI processes configured for one UE share a dependent value for CoMP scheduling efficiency. For example, if a first cell and a second cell are subjected to joint transmission (JT), RIs and subband indices of a first CSI process for the first cell and a second CSI process for the second cell should be the same in order to facilitate JT scheduling.

Accordingly, some or all of the CSI processes configured for the UE may be restricted to have a common CSI (e.g., RI) value. For convenience of description, among the CSI processes restricted to have the common CSI value, a CSI process which is used as a reference for setting a CSI value is referred to as a reference CSI process and the CSI processes other than the reference CSI process are referred to as following CSI processes. The following CSI process may feed the same value as the CSI value of the reference CSI process back without separate computation.

Here, since the CSI feedback configuration of each CSI process may be independently set, collision between CSI processes may occur. For example, a reporting type of one CSI process and a reporting type of another CSI process may be configured to be fed back at the same time such that collision between the CSI processes may occur. More specifically, when CSI feedback is performed according to a plurality of CSI processes each having a constant period and offset, the plurality of CSI processes may be fed back on the same subframe, such that collision may occur.

Hereinafter, a method of handling collision between reporting types including an RI if collision between CSI processes occurs is proposed. For example, this method is applicable to collision occurring among type 3, type 5 and type 6 among CSI reporting types defined in LTE release 10. A CSI reporting type defined in LTE release 10 will now be described.

A type 1 report supports CQI feedback for a UE in a selected subband. A type 1 a report supports subband CQI and second PMI feedback. Type 2, type 2b type 2c reports support broadband CQI and PMI feedback. A type 2a report supports broadband PMI feedback. A type 3 report supports RI feedback. A type 4 report supports broadband CQI. A type 5 report supports RI and broadband PMI feedback. A type 6 report supports RI and PTI feedback.

According to definition of LTE release 10, if collision between CSI processes occurs, drop priority is first determined according to a reporting type. If drop priorities according to the reporting type are the same, a CSI process having a lower CSI process index has higher priority. CSI reporting types 3, 5 and 6 have the same priority. Since the priorities according to the reporting type are the same, a CSI process excluding a CSI process having a lowest index is dropped.

Hereinafter, a method of handling collision between a type 6 report of a following CSI process and a type 3, type 5 or type 6 report of a reference CSI process will be described.

According to the present invention, a UE preferentially feeds a report of a reference CSI process back and drops a type 6 report of a following CSI process. That is, the index of the reference CSI process may be set to be lower than the index of the following CSI process. At this time, the type 6 report of the following CSI process is dropped together with a PTI joint encoded with an RI. The UE may determine the dropped PTI value using the following method.

First, the UE may determine the PTI value of the following CSI process to be the PTI value of the reference CSI process.

More specifically, if the type 6 report of the following CSI process and the type 3, type 5 or type 6 report of the reference CSI process collide, the UE determines the PTI value of the following CSI process to be the PTI value of the currently fed-back reference CSI process. That is, after the collision time, the UE calculates and reports CQI or PMI of the following CSI process based on the PTI value of the reference CSI process. Thereafter, if the UE feeds the type 6 report of the following CSI process back without collision, the UE calculates CQI or PMI based on the PTI value of the newly fed-back following CSI process, not based on the PTI value of the reference CQI process.

Next, the UE may determine the PTI value of the following CSI process to be a default PTI value.

More specifically, if the type 6 report of the following CSI process and the type 3, type 5 or type 6 report of the reference CSI process collide, the UE may determine the PTI value of the following CSI process to be a default PTI value. The default PTI value may be 0 or 1 and the BS and the UE may share the predetermined default PTI value. Thereafter, if the UE feeds the type 6 report of the following CSI process back without collision, the UE calculates CQI or PMI based on the PTI value of the newly fed-back following CSI process, not based on the default PTI value.

Next, the UE may determine the PTI value of the following CSI process to be a recently reported PTI value according to the following CSI process.

More specifically, if the type 6 report of the following CSI process and the type 3, type 5 or type 6 report of the reference CSI process collide, the UE may determine the PTI value of the following CSI process to be a recently reported PTI value according to the following CSI process. Thereafter, if the UE feeds the type 6 report of the following CSI process back without collision, the UE calculates CQI or PMI based on the PTI value of the newly fed-back following CSI process, not based on the recently reported PTI value, according to the following CSI process.

If the type 6 report of the following CSI process and the type 3, type 5 or type 6 report of the reference CSI process collide, the UE may multiplex the PTI value of the following CSI process with the reference CSI process and report the multiplexed result.

Hereinafter, a method of handling collision between the type 5 report of the following CSI process and the type 3, type 5 or type 6 report of the reference CSI process will be described. That is, the case in which, instead of the type 6 report of the following CSI process of the above-described method, the type 5 report of the following CSI process collides with the type 3, type 5 or type 6 report of the reference CSI process will be described.

According to the present invention, the UE preferentially feeds a report of a reference CSI process back and drops a type 5 report of a following CSI process. That is, the index of the reference CSI process may be set to be lower than the index of the following CSI process. At this time, the type 5 report of the following CSI process is dropped together with a PMI (W1) joint encoded with an RI. The UE may determine the dropped W1 value using the following method.

First, the UE may determine the W1 value of the following CSI process to be the W1 value of the reference CSI process.

More specifically, if the type 5 report of the following CSI process and the type 5 report of the reference CSI process collide, the UE determines the W1 value of the following CSI process to be the W1 value of the currently fed-back reference CSI process. That is, after the collision time, the UE calculates and reports CQI or PMI of the following CSI process based on the W1 value of the reference CSI process. Thereafter, if the UE feeds the type 5 report of the following CSI process back without collision, the UE calculates CQI or PMI based on the W1 value of the newly fed-back following CSI process, not based on the W1 value of the reference CQI process.

Figure 17:
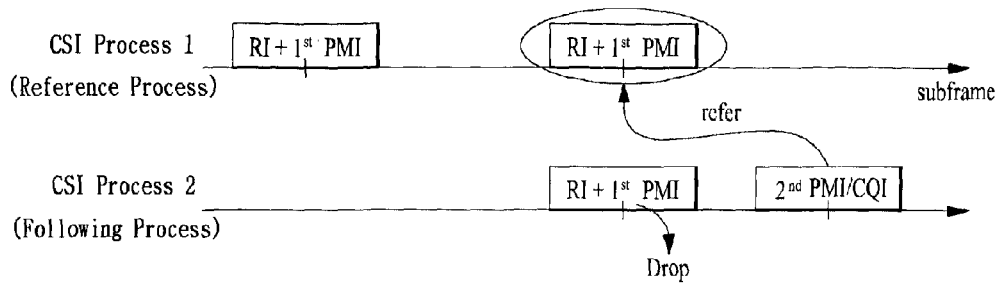
FIG. 17 illustrates the case in which a type 5 report of a following CSI process and a type 5 report of a reference CSI process collide.

FIG. 17 shows an example of determining the W1 value of the following CSI process to be the W1 value of the reference CSI process if the type 5 report of the following CSI process and the type 5 report of the reference CSI process collide.

Referring to FIG. 17, if the type 5 reports of CSI process 1, which is the reference CSI process, and CSI process 2, which is the following CSI process, collide, the UE drops the type 5 report of CSI process 2 which is the following CSI process. After the type 5 report of CSI process 2 is dropped, the UE calculates and reports CQI or PMI of CSI process 2, which is the following CSI process, based on the W1 value of CSI process 1 which is the reference CSI process.

Next, the UE may determine the W1 value of the following CSI process to be a default W1 value.

More specifically, if the type 5 report of the following CSI process and the type 3, type 5 or type 6 report of the reference CSI process collide, the UE may determine the W1 value of the following CSI process to be a default W1 value. The default W1 value may be 0 or 1 and the BS and the UE may share the predetermined default W1 value. Thereafter, if the UE feeds the type 5 report of the following CSI process back without collision, the UE calculates CQI or PMI based on the W1 value of the newly fed-back following CSI process, not based on the default W1 value.

Next, the UE may determine the W1 value of the following CSI process to be a recently reported W1 value according to the following CSI process.

More specifically, if the type 5 report of the following CSI process and the type 3, type 5 or type 6 report of the reference CSI process collide, the UE may determine the W1 value of the following CSI process to be a recently reported W1 value according to the following CSI process. Thereafter, if the UE feeds the type 5 report of the following CSI process back without collision, the UE calculates CQI or PMI based on the W1 value of the newly fed-back following CSI process, not based on the recently reported PTI value, according to the following CSI process.

If the type 5 report of the following CSI process and the type 3, type 5 or type 6 report of the reference CSI process collide, the UE may multiplex the W1 value of the following CSI process with the reference CSI process and report the multiplexed result.

Figure 18:
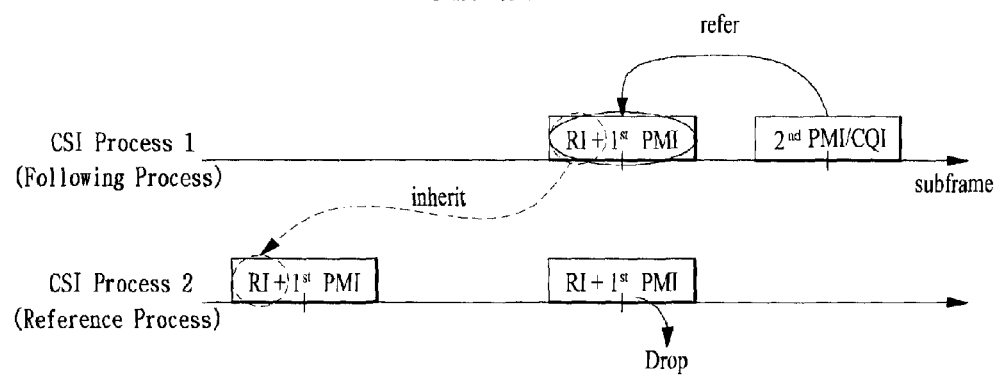
FIG. 18 is a diagram showing another embodiment of the case in which a type 5 report of a following CSI process and a type 5 report of a reference CSI process collide.

FIG. 18 is a diagram showing another embodiment of the case in which a type 5 report of a following CSI process and a type 5 report of a reference CSI process collide.

If the type 5 report of the following CSI process and the type 5 report of the reference CSI process collide, the UE may determine priority according to the following drop rule without preferentially considering the report of the reference CSI process. Upon collision between CSI processes, the UE may assign higher priority in order of a reporting type, a CSI process index and a component carrier (CC) index. At this time, the situation shown in FIG. 18 may occur.

Referring to FIG. 18, the following CSI process has a CSI process index of 1, the reference CSI process has a CSI process index of 2, and the two CSI process collide at a specific time. According to the above-described drop rule, since the reporting types of the two CSI processes are the same, the UE determines priority according to the CSI process index. Accordingly, the UE drops the CSI of the reference CSI process having the higher CSI process index. At this time, the RI of the following CSI process inherits the recently reported RI value according to the reference CSI process. The W1 value of the following CSI process subjected to joint encoding may not be inherited but may be independently determined. In case of FIG. 17, since the W1 value of the following CSI process is also dropped, the W1 value of the reference CSI process is efficiently inherited. However, in case of FIG. 18, since the W1 value of the following CSI process is not dropped, the W1 value of the following CSI process may be independently determined. In FIG. 18, after collision, the W2 and CQI value of the following CSI process are calculated based on the recently reported RI and W1 value. At this time, the RI is the RI value of the reference CSI process before collision and W1 may be independently determined based on the RI value in the following CSI process.

Figure 19:
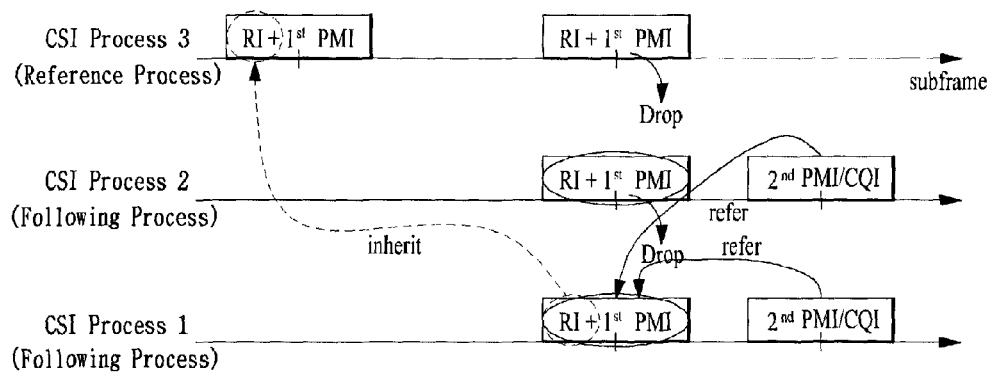
FIG. 19 is a diagram showing an embodiment in which three CSI processes collide as an extension of FIG. 18.

FIG. 19 is a diagram showing an embodiment in which three CSI processes collide as an extension of FIG. 18.

Referring to FIG. 19, CSI processes 1 and 2 are configured as following CSI processes, a CSI process 3 is configured as a reference CSI process and the three CSI processes collide at a specific time. According to the above-described drop rule, the CSI process 2 having a higher CSI process index and the CSI process 3 which is the reference CSI process are dropped. In this case, the RI of the CSI process 1 inherits a recently reported RI value according to the reference CSI process. The W1 value subjected to joint encoding may be independently determined instead of being inherited. The CSI process 2 inherits the RI and W1 value of the CSI process 1. That is, if the reference CSI process and two or more following CSI process collide, one following CSI process inherits the value of the remaining following CSI process if both the report thereof and the report of the reference process are dropped. In FIG. 19, the RI of the CSI process 2 inherits the RI value of the CSI process 1. The W1 value of the CSI process 2 inherits the W1 value of the CSI process 1. The W1 value of the CSI process 1 is determined independently of the reference CSI process. Therefore, the CSI process 2 does not inherit the W1 value of the reference CSI process but inherits the value of the remaining following CSI process.

Although the RI and the PMI are subjected to joint encoding in FIG. 19, the following CSI process inheriting the value of the remaining following CSI process if the reference CSI process and two or more following CSI process collide is applicable to the case in which only the RI value is reported or the RI and the PTI are subjected to joint encoding.

As in the embodiment of FIG. 18 or 19, if the index of the reference CSI process is higher than the index of the following CSI process, the reference CSI process is dropped and the inherited RI value of the reference CSI process becomes a previous value. That is, since previous channel information is reported, CSI feedback accuracy is decreased. Accordingly, when the reference CSI process and the following CSI process collide, the index of the reference CSI process is preferably set to be lower than the index of the following CSI process such that the reference CSI process is not dropped. Alternatively, the index of the reference CSI process may be set to be fixed to 1 which is a lowest CSI process index. In this case, the UE anticipates that the BS sets the index of the reference CSI process to 1.

If the index of the reference CSI process is higher than the index of the following CSI process and the periods and offsets of the two CSI processes are the same such that collision between the CSI processes always occurs, the reference CSI process is always dropped and the value inherited by the following CSI process may be removed. This problem may be resolved using the following two methods. First, if the index of the reference CSI process is set to be higher than the index of the following CSI process, the periods and offsets of the two CSI processes may not be set to be equal. Next, if the periods and offsets of the reference CSI process and the following CSI process are the same, the index of the reference CSI process is not set to be higher than the index of the following CSI process. Alternatively, the index of the reference CSI process may be set to 1.

Contradiction in Common CSI Application in CoMP

Codebook subset restriction means that a UE is restricted to select a precoder only within a subset including elements in a codebook. That is, codebook subset restriction means that a codebook including various precoding matrices is generated and then available precoding matrices are restricted according to the cell or UE. If codebook subset restriction is used, an overall wireless communication system has a codebook having a-large size but a codebook used by each UE includes a subset of a codebook. Thus, precoding gain may be increased.

Here, if codebook subset restriction is independently set according to the CSI process, the RI of the following CSI process and the RI (common RI) of the reference CSI process may not be set to the same value. That is, a problem may occur upon application of the common RI due to codebook subset restrictions. For example, if codebook subset restriction is set such that the reference CSI process uses ranks 1 and 2 and the following CSI process uses only rank 1, available RIs are different and thus a problem may occur. That is, if the RI of the reference CSI process is 2, the rank of the following CSI process may not be set to 2 due to codebook subset restriction. In this case, the UE may perform the following procedure.

First, the UE may determine and feed the RI of the following CSI process back separately from the RI of the reference CSI process. In this case, codebook subset restriction is applied ahead of the RI of the reference CSI process. Accordingly, in this case, the common RI is not applied. When the RI of the following CSI process is selected, the UE determines available RIs according to the codebook subset restriction of the following CSI process and selects an optimal RI from among the available RIs based on a non zero power (NZP) CSI and IMR measurement value of the following CSI process.

Next, the UE may determine the RI of the following CSI process to be the same value as the RI of the reference CSI process. In this case, the RI of the reference CSI process is applied ahead of codebook subset restriction. Accordingly, in this case, the codebook subset restriction of the following CSI process is not applied.

Next, available RIs may be determined according to codebook subset restriction of the following CSI process and an RI most approximate to the RI of the reference CSI process may be selected from among the available RIs. In case of periodic feedback, the RI of the following CSI process means a most recent value among values reported when or before the RI of the following CSI process is reported. In case of aperiodic feedback, the RI of the following CSI process means a value reported at the same time as the RI of the following CSI process.

Next, available RIs may be determined according to codebook subset restriction of the following CSI process and a smallest RI may be selected from among the available RIs.

As described above, in order to prevent a contradiction between codebook subset restriction of the following CSI process and application of the common RI, codebook subset restriction may not be independently set according to the CSI process. That is, the BS may set the same codebook subset restriction with respect to the following CSI process and the reference CSI process and the UE may anticipate that the codebook subset restriction of the following CSI process is equal to the codebook subset restriction of the reference CSI process.

In addition, in order to prevent the above-described problems, the BS may set the codebook subset restriction of the following CSI process and the codebook subset restriction of the reference CSI process such that the available RI of the following CSI process is equal to the available RI of the reference CSI process. Similarly, the UE may not anticipate that the codebook subset restriction of the following CSI process and the codebook subset restriction of the reference CSI process are set such that the available RI of the following CSI process and the available RI of the reference CSI process are different.

In order to prevent the above-described problem, the BS may set the codebook subset restriction of the following CSI process and the codebook subset restriction of the reference CSI process such that a set of available RIs of the following CSI process is equal to a set of available RIs of the reference CSI process or a superset thereof. That is, the UE may anticipate that the codebook subset restriction of the following CSI process and the codebook subset restriction of the reference CSI process are set such that a set of available RIs of the following CSI process is equal to a set of available RIs of the reference CSI process or a superset thereof. Similarly, the UE may not anticipate that the codebook subset restriction of the following CSI process and the codebook subset restriction of the reference CSI process are set such that a set of available RIs of the following CSI process is not included in a set of available RIs of the reference CSI process.

Although the above-described features describe the case in which a there is a contradiction between the codebook subset restriction of the following CSI process and the application of the common RI, the present invention is not limited thereto and is applicable to the case in which there is a contradiction between the application of the common PMI and the codebook subset restriction of the following CSI process. Hereinafter, a procedure when there is a contradiction between the application of the common PMI and the codebook subset restriction of the following CSI process will be described.

First, the UE may determine and feed the PMI of the following CSI process back separately from the PMI of the reference CSI process. In this case, codebook subset restriction is applied ahead of the PMI of the reference CSI process. Accordingly, in this case, the common PMI is not applied. When the PMI of the following CSI process is selected, the UE determines available PMIs according to codebook subset restriction of the following CSI process and selects an optimal RI from among the available PMIs based on a non zero power (NZP) CSI and IMR measurement value of the following CSI process.

Next, the UE may determine the PMI of the following CSI process to be the same value as the PMI of the reference CSI process. In this case, the PMI of the reference CSI process is applied ahead of codebook subset restriction. Accordingly, in this case, the codebook subset restriction of the following CSI process is not applied.

Next, available PMIs may be determined according to the codebook subset restriction of the following CSI process and a PMI most approximate to the PMI of the reference CSI process may be selected from among the available PMIs. For example, an approximation degree between two PMIs may be determined based on Euclidean distance or correlation between the two PMIs. More specifically, as correlation is increased or as Euclidean distance is decreased, it may be determined that the two PMIs are approximate to each other. In case of periodic feedback, the PMI of the following CSI process means a most recent value among values reported when or before the PMI of the following CSI process is reported. In case of aperiodic feedback, the PMI of the following CSI process means a value reported at the same time as the PMI of the following CSI process.

Next, available PMIs may be determined according to the codebook subset restriction of the following CSI process and a smallest PMI may be selected from among the available PMIs.

As described above, in order to prevent a contradiction between codebook subset restriction of the following CSI process and application of the common CSI, codebook subset restriction may not be independently set according to the CSI process. That is, the BS may set the same codebook subset restriction with respect to the following CSI process and the reference CSI process and the UE may anticipate that the codebook subset restriction of the following CSI process is equal to the codebook subset restriction of the reference CSI process.

Hereinafter, similarly to a contradiction between codebook subset restriction and common CSI, the case in which the number of CSI-RS antenna ports of the following CSI process and the number of CSI-RS antenna ports of the reference CSI process are different will be described.

If the number of CSI-RS antenna ports of the following CSI process and the number of CSI-RS antenna ports of the reference CSI process are different, it is impossible to equally set the RIs and PMIs of the two CSI processes. For example, if the number of CSI-RS antenna ports of the following CSI process and the number of CSI-RS antenna ports of the reference CSI process are respectively set to 4 and 8 and the RI of the reference CSI process is set to 8, the RI of the following CSI process may not be equally set to 8.

In order to solve such a problem, the BS may equally set the number of CSI-RS antenna ports of the following CSI process and the number of CSI-RS antenna ports of the reference CSI process. At this time, the UE may anticipate that the number of CSI-RS antenna ports of the following CSI process and the number of CSI-RS antenna ports of the reference CSI process are the same. Similarly, the UE may not anticipate that the number of CSI-RS antenna ports of the following CSI process and the number of CSI-RS antenna ports of the reference CSI process are different.

As another embodiment, the BS may set the number of CSI-RS antenna ports of the following CSI process to be equal to or greater than the number of CSI-RS antenna ports of the reference CSI process. That is, the UE may anticipate that the number of CSI-RS antenna ports of the following CSI process is equal to or greater than the number of CSI-RS antenna ports of the reference CSI process. If the number of CSI-RS antenna ports of the following CSI process is equal to or greater than the number of CSI-RS antenna ports of the reference CSI process, no problem occurs.

As another method, if the number of CSI-RS antenna ports of the following CSI process and the number of CSI-RS antenna ports of the reference CSI process are different, the UE may calculate the RI and PMI of the following CSI process separately from the RI and PMI of the reference CSI process. Alternatively, if the number of CSI-RS antenna ports of the following CSI process is less than the number of CSI-RS antenna ports of the reference CSI process, the UE may calculate the RI and PMI of the following CSI process separately from the RI and PMI of the reference CSI process.

Hereinafter, a contradiction in the application of the common CSI, which occurs if a configuration for activation of the RI and PMI report is independent in each CSI process, will be described.

If the configuration for activation of the RI and PMI report is independent according to the CSI process, the RI of the following CSI process may not be determined to be the same value as the RI of the reference CSI process. For example, although the RI and PMI report of the reference CSI process is activated and the RI is set to 2, if the RI and PMI report of the following CSI process is deactivated, the rank of the following CSI process may not be set to 2. In this case, the UE may perform the following procedure.

First, the RI and PMI report of the following CSI process may be deactivated. In this case, a configuration for deactivation of the RI report of the following CSI process is applied ahead of application of the RI of the reference CSI process. At this time, the RI of the reference CSI process is not applied.

Next, the RI of the following CSI process may be determined to be the same value as the RI of the reference CSI process. In this case, application of the RI of the reference CSI process is applied ahead of the configuration for deactivation of the RI and PMI report of the following CSI process. At this time, the configuration for deactivation of the RI and PMI report of the following CSI process is not valid.

In order to prevent the above-described problem, the RI and PMI reports of the following CSI process and the reference CSI process may remain constantly activated. At this time, the BS may configure both the RI and PMI reports of the following CSI process and the reference CSI process to be activated. The UE may anticipate that both the RI and PMI reports of the following CSI process and the reference CSI process are activated.

Priority Upon Collision Between CSI Processes

Hereinafter, a method of determining reported CSI and dropped CSI according to priority if two or more CSI processes collide in periodic CSI feedback using a PUCCH will be described.

Upon collision between CSI processes, priority of CSI reporting currently defined in LTE release 10 is as follows. Upon collision between CSI processes, the UE assigns higher priority in order of a reporting type, a CSI process index and a CC index.

For example, priority of the reporting type is first considered and then, if the priorities of the reporting types are the same, a lower index has higher priority based on the CSI process index. If the priorities of the reporting types are the same and the CSI process indices are the same, a CSI process having a lower CC index has higher priority.

The priority according to the reporting type is determined as follows. In a corresponding subframe, if the CSI report of PUCCH reporting type 3, 5, 6 or 2a collides with the CSI report of PUCCH reporting type 1, 1a, 2, 2b, 2c or 4, the latter CSI report has low priority and is dropped. In a corresponding subframe, if the CSI report of PUCCH reporting type 2, 2b, 2c or 4 collides with the CSI report of the PUCCH reporting type 1 or 1a, the latter CSI report has low priority and is dropped.

In the present invention, details of the priority of the conventional reporting type are proposed. According to the present invention, in a corresponding subframe, if the CSI report of PUCCH reporting type 5 or 6 collides with the CSI report of the PUCCH reporting type 3, the latter CSI report has low priority and is dropped.

The priorities of the above-described PUCCH reporting type 3, 5 and 6 may be applied upon collision between the reference CSI process and the following CSI process. For example, if the reporting type 6 of the following CSI process and the reporting type 3 of the reference CSI process collide in the same subframe, the CSI report of the reporting type 3 is dropped and the CSI of the reporting type 6 of the following CSI process is reported.

Since not only the RI but also the PTI are subjected to joint encoding in the PUCCH reporting type 6, not only the RI but also the PTI value may be reported without loss, by applying the priority of the present invention. Similarly, since not only the RI but also the W1 value are subjected to joint encoding in the PUCCH reporting type 5, not only the RI but also the W1 value may be reported without loss, by applying the above-described priority.

At this time, the RI value of the reference CSI process is dropped but the same RI value as the RI of the reference process is reported via type 5 or 6. Therefore, the UE calculates the PMI and CQI of the reference CSI process based on the RI value of type 5 or 6 until the RI of a next reference CSI process is reported.

In a conventional system, an ACK/NACK report for data and CSI (RI/PMI/subband index) feedback collide, the ACK/NACK report is preferentially considered and the CSI is dropped. However, if the CSI of the reference CSI and the ACK/NACK report collide, the CSI report of the reference CSI process preferably has priority higher than that of the ACK/NACK report. The CSI of the reference SI process is reported and the ACK/NACK report is dropped. Since the CSI of the reference CSI process is referred to by one or more following CSI processes, if the CSI report of the reference CSI process is dropped, the CSI value of the following CSI process may be influenced. Accordingly, if the CSI of the reference CSI process and the ACK/NACK report collide, the CSI report of the reference CSI process preferably has priority higher than that of the ACK/NACK report.

Figure 20:
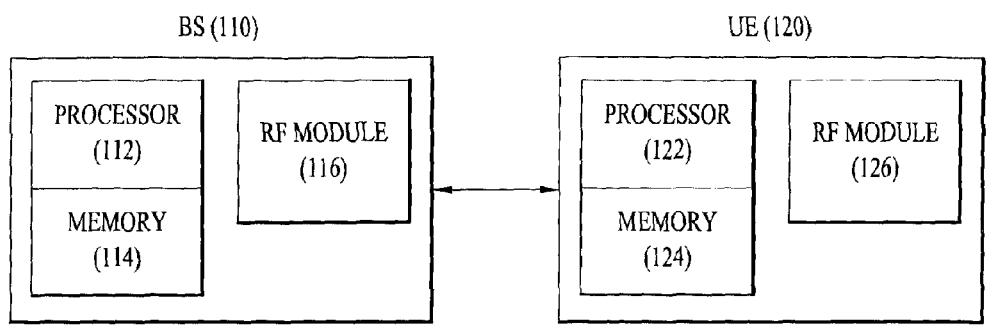
FIG. 20 is a diagram showing a BS and a UE which are applicable to the present invention.

FIG. 20 is a diagram showing a BS and a UE which are applicable to the present invention.

If a wireless communication system includes a relay, communication in a backhaul link is performed between the BS and the relay and communication in an access link is performed between the relay and the UE. Accordingly, the BS and UE shown in FIG. 20 may be replaced with the relay according to situation.

Referring to FIG. 20, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

In this document, the embodiments of the present invention have been described centering on a data transmission and reception relationship between a UE and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

MODE FOR INVENTION

Various embodiments have been described in the best mode for carrying out the invention.

INDUSTRIAL APPLICABILITY

The present invention is applicable to a wireless communication apparatus such as a UE, a relay or a BS.

The invention claimed is:

1. A method for receiving a CSI-RS (Channel State Information-Resource Signal) by a user equipment (UE) in a wireless access system, the method comprising:
   receiving a configuration for a CSI (Channel State Information) process;
   receiving the CSI-RS associated with the CSI process from a base station,
   wherein, when a RI (Rank Indicator)-reference CSI process is configured, the UE is not expected to receive the configuration for the CSI process and configuration for the RI-reference CSI process that have a different number of CSI-RS antenna ports.

2. The method of claim 1, wherein a RI of the CSI process is configured the same as a RI of the RI-reference CSI process.

3. The method of claim 1, wherein the configurations for the CSI process and the RI-reference CSI process are received through RRC (Radio Resource Control) layer signaling.

4. The method of claim 1, wherein the CSI includes at least one of a RI, a PMI (Precoding Matrix Indicator), and a CQI (Channel Quality Indicator).

5. A user equipment (UE) in a wireless access system, the UE comprising:
   a RF (Radio Frequency) module; and
   a processor that controls the RF module to:
   receive a configuration for a CSI (Channel State Information) process;
   receive a CSI-RS (Channel State Information-Resource Signal) associated with the CSI process from a base station,
   wherein, when a RI (Rank Indicator)-reference CSI process is configured, the UE is not expected to receive the configuration for the CSI process and configuration for the RI-reference CSI process that have a different number of CSI-RS antenna ports.

6. The UE of claim 5, wherein a RI of the CSI process is configured the same as a RI of the RI-reference CSI process.

7. The UE of claim 5, wherein the configurations for the CSI process and the RI-reference CSI process are received through RRC (Radio Resource Control) layer signaling.

8. The UE of claim 5, wherein the CSI includes at least one of a RI, a PMI (Precoding Matrix Indicator), and a CQI (Channel Quality Indicator).

* * * * *